(12) United States Patent
Panigrahi et al.

(10) Patent No.: US 11,676,429 B2
(45) Date of Patent: Jun. 13, 2023

(54) VEHICLE WHEEL IMPACT DETECTION AND RESPONSE

(71) Applicant: Ford Global Technologies, LLC, Dearborn, MI (US)

(72) Inventors: Smruti Panigrahi, Farmington Hills, MI (US); Devon Eyerman, Plymouth, MI (US); Colm Boran, Novi, MI (US); Dexin Wang, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 764 days.

(21) Appl. No.: 16/559,909

(22) Filed: Sep. 4, 2019

(65) Prior Publication Data

US 2021/0065482 A1 Mar. 4, 2021

(51) Int. Cl.
*G07C 5/08* (2006.01)
*G06N 3/08* (2023.01)
*H04L 12/40* (2006.01)
*G05D 1/00* (2006.01)

(52) U.S. Cl.
CPC .......... *G07C 5/0841* (2013.01); *G05D 1/0055* (2013.01); *G06N 3/08* (2013.01); *H04L 12/40* (2013.01); *H04L 2012/40215* (2013.01); *H04L 2012/40273* (2013.01)

(58) Field of Classification Search
CPC ........ G07C 5/0841; G05D 1/005; G06N 3/08; H04L 12/40; H04L 2012/40215; H04L 2012/40273
See application file for complete search history.

(56) References Cited

U.S. PATENT DOCUMENTS

| | | | |
|---|---|---|---|
| 6,609,051 B2 | 8/2003 | Fiechter et al. | |
| 8,788,176 B1 | 7/2014 | Yopp | |
| 10,086,668 B2 | 10/2018 | Hill et al. | |
| 10,395,444 B1 | 8/2019 | Edren et al. | |
| 10,643,285 B1 | 5/2020 | Tofte et al. | |
| 2016/0116343 A1 | 4/2016 | Dixon et al. | |
| 2016/0280130 A1* | 9/2016 | Kia | G07C 5/0816 |
| 2016/0335814 A1 | 11/2016 | Tamari et al. | |
| 2017/0174193 A1* | 6/2017 | Kirkpatrick | B60C 23/0408 |
| 2018/0011953 A1 | 1/2018 | Micks et al. | |
| 2018/0315260 A1 | 11/2018 | Anthony | |

(Continued)

FOREIGN PATENT DOCUMENTS

| | | |
|---|---|---|
| CN | 201659856 U | 12/2010 |
| CN | 106198058 A | 12/2016 |

(Continued)

OTHER PUBLICATIONS

Non-Final Office Action dated Jun. 24, 2020 for U.S. Appl. No. 16/036,328 (22 pages).

*Primary Examiner* — James J Lee
*Assistant Examiner* — Steven Vu Nguyen
(74) *Attorney, Agent, or Firm* — Frank A. MacKenzie; Bejin Bieneman PLC

(57) ABSTRACT

A computer can be programmed to determine that an impact to a wheel of a vehicle exceeds an impact severity threshold and transmit a message describing the impact via a vehicle communications network. An electronic controller can be programmed to make an adjustment to monitoring the component based on receiving the message in the electronic controller.

8 Claims, 8 Drawing Sheets

(56) References Cited

U.S. PATENT DOCUMENTS

| | | | |
|---|---|---|---|
| 2018/0362076 A1 | 12/2018 | Rowell et al. | |
| 2019/0079513 A1* | 3/2019 | Greenfield | G06F 11/2038 |
| 2019/0354772 A1 | 11/2019 | Tasli et al. | |
| 2019/0371093 A1* | 12/2019 | Edren | G07C 5/0816 |
| 2020/0302708 A1* | 9/2020 | Thompson | G07C 5/0825 |
| 2022/0148342 A1* | 5/2022 | Fagergren | B60W 50/10 |

FOREIGN PATENT DOCUMENTS

| | | |
|---|---|---|
| CN | 107203197 A | 9/2017 |
| DE | 102008052370 A1 | 4/2010 |
| DE | 102009029232 A1 | 3/2011 |
| WO | 201220166 A1 | 2/2012 |

\* cited by examiner

US 11,676,429 B2

VEHICLE WHEEL IMPACT DETECTION AND RESPONSE

BACKGROUND

Vehicle wheel impacts (for example caused by a vehicle traveling along a roadway and a vehicle wheel being impacted by a road condition such as a pothole, bump, etc.) can impair vehicle operation and/or give rise to repair and/or maintenance needs (i.e., a "vehicle health condition"). Vehicle wheel impacts may not be detected in short order, exacerbating vehicle health conditions and making identification of contributing road conditions difficult.

DETAILED DESCRIPTION

Figure 1:
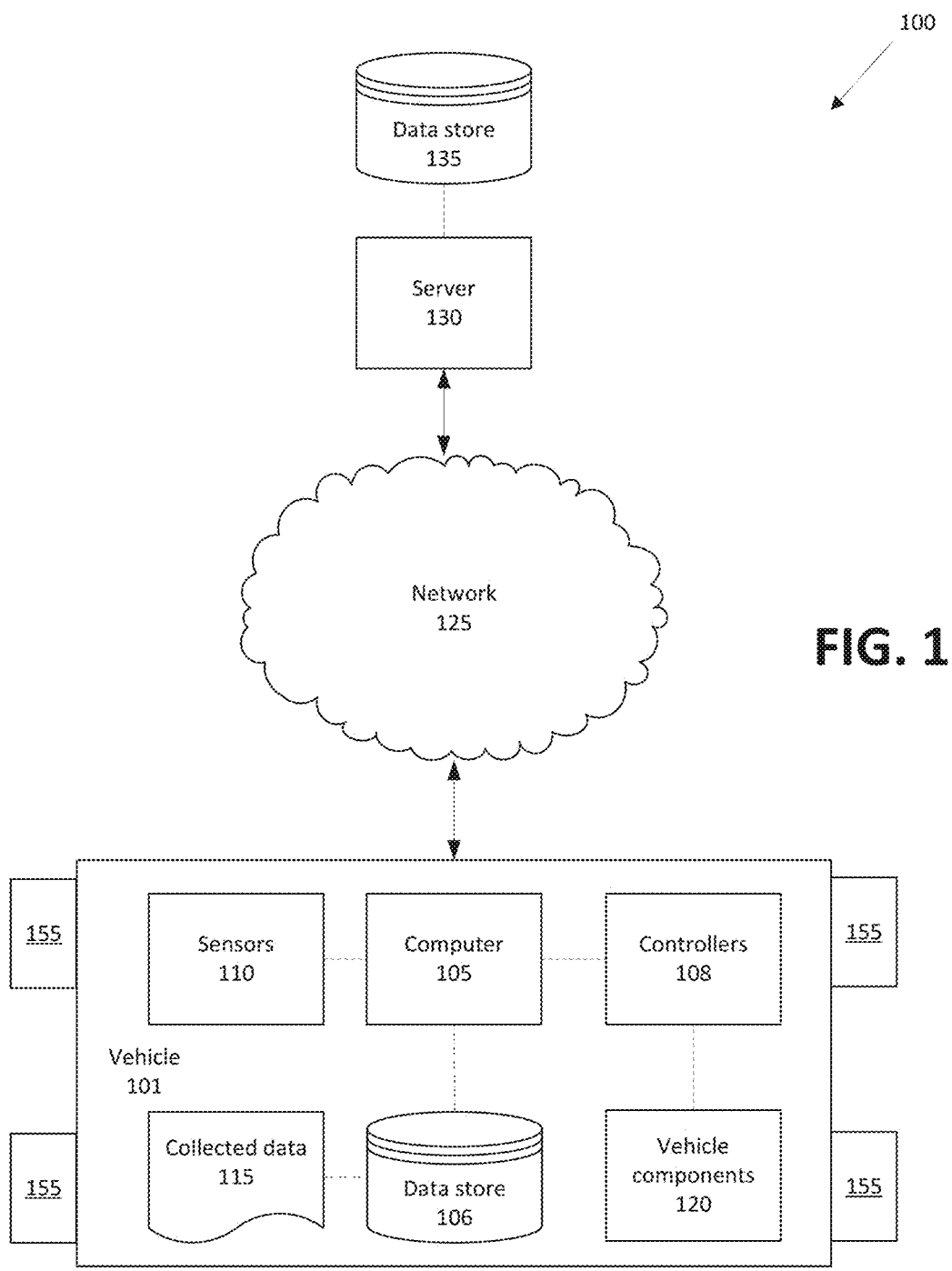
FIG. 1 illustrates an exemplary system for early detection of vehicle health conditions resulting from vehicle wheel impacts.

A system comprises a computer in a vehicle and an electronic controller for a component in the vehicle. The computer can be programmed to determine that an impact to a wheel of a vehicle exceeds an impact severity threshold and transmit a message describing the impact via a vehicle communications network. The electronic controller can be programmed to, based on receiving the message in the electronic controller, make an adjustment to monitoring the component. The computer can be further programmed to determine that the impact exceeds the impact severity threshold including by determining that a plurality of wheel impacts exceed the impact severity threshold. The computer can be further programmed to determine that the plurality of wheel impacts exceeds the impact severity threshold including by determining that the total wheel impact count (TC) exceeds a total wheel impact count (TC) severity level threshold. The adjustment to monitoring is based identifying the wheel impacted. The adjustment by the controller can include at least one of reducing a fault maturation time, resetting the fault maturation time, adjusting a monitoring parameter, adjusting one or more of a rate of data monitoring and sampling, and modifying operation of the component. The controller can be further programmed to monitor the component based on the adjustment and perform an action upon determining based on the monitoring that a vehicle health condition is indicated.

A method comprises determining that an impact to a wheel of a vehicle exceeds an impact severity threshold; transmitting a message describing the impact via a vehicle communications network; and based on receiving the message in a controller for a vehicle component, making an adjustment to monitoring the vehicle component. Determining that the impact to the wheel of the vehicle exceeds an impact severity threshold can include determining that a severity level of a plurality of wheel impacts exceeds the severity level threshold. Determining that the impact to the wheel of the vehicle exceeds the impact severity threshold can include determining that a total wheel impact count (TC) exceeds a total wheel impact count (TC) severity level threshold. Transmitting the message can include transmitting the message to a selected controller based on an impact severity level and an identity of the wheel impacted. The controller, based on receiving the message, can adjust monitoring of the vehicle component. Adjusting monitoring can include an adjustment based on an impact severity level and the identity of the wheel impacted. The controller can adjust monitoring by, at least one of reducing a fault maturation time, resetting the fault maturation time, adjusting a monitoring parameter; adjusting one or more of a rate of data monitoring and sampling; and modifying operation of the component. The controller can monitor the vehicle component based on the monitoring adjustment, determine whether the monitoring indicates a vehicle health condition, and perform an action when the vehicle health condition is indicated.

A controller for a component of a vehicle comprises a processor and a memory. The memory stores instructions executable by the processor. The controller can be programmed to receive a message from a computer in the vehicle describing a detected impact to a wheel of the vehicle and adjust monitoring of the component based on receiving the message. The controller can adjust monitoring based on an impact severity level and an identity of the wheel impacted. The controller can adjust monitoring by at least one of reducing a fault maturation time, resetting the fault maturation time, adjusting a monitoring parameter, adjusting one or more of a rate of data monitoring and sampling, and modifying operation of the component. The controller can be further programmed to monitor the component based on a monitoring adjustment, determine whether the monitoring indicates a vehicle health condition, and perform an action when it is determined that the vehicle health condition is indicated. The controller can perform the action by modifying operation of the vehicle so that the vehicle continues its intended path or stops based on the vehicle health condition.

Vehicle health conditions can be determined or predicted from data about vehicle wheel impacts, i.e., data from one or more vehicle components and proximate in time, i.e., at a time of and/or immediately (i.e., within 1000 milliseconds or less) after, a vehicle wheel impact. Vehicle health conditions can be prevented, remedied, and/or mitigated by monitoring the vehicle components proximate in time to the vehicle wheel impact. In addition, detection of vehicle health conditions resulting from a wheel impact can be a basis to adjust an affected component for maintaining the vehicle on an intended path or for stopping the vehicle if warranted, depending on the detected vehicle health condition (e.g., if a vehicle is capable of autonomous or semi-autonomous operation).

A "vehicle health condition" is a condition of a vehicle or a vehicle component that impairs vehicle operation and/or gives rise to repair and/or maintenance needs. A vehicle health condition includes a defect or degradation in a vehicle component as a result of a vehicle wheel impact that may result in impairing vehicle operation and/or give rise to repair and/or maintenance needs, and the health condition can be determined even if a fault and/or severity level is not indicated by a fault code, diagnostic trouble code (DTC), or the like, or a fault code, DTC, etc., is below a threshold that indicates an immediate service need, imminent failure, etc. Vehicle wheel impacts can affect tires and wheels, but also many other vehicle components. Non-limiting examples of a vehicle health condition include a tire pressure above or below a tire pressure threshold, a steering misalignment, a wheel imbalance, suspension damage, broken or damaged components such as bumpers, fascia, light assemblies, etc.

Vehicles can utilize sensor data for detecting a vehicle wheel impact and determining whether a vehicle component is operating properly. The data is typically provided as digital signals and can be provided in a message on a vehicle network such as a CAN bus. Whether due to background electromagnetic interference (EMI) ("noise"), CAN bus congestion, and/or other causes, it is currently a problem that a vehicle wheel impact and/or vehicle health condition may not be detected proximate in time to the wheel impact, if at all. A controller for a vehicle component conventionally uses long-term averaging of the sensor data and operating parameter data to monitor the vehicle component. Long-term averaging can obscure vehicle wheel impacts and the resulting stress on vehicle components, preventing discovery of a vehicle health condition for an extended period. For example, a vehicle wheel impact of a low severity level may not be detected and/or or immediately result in a vehicle health condition, but repetitive low severity wheel impacts can result in a vehicle health condition because the vehicle component can only be subjected to so many cycles of stress before a vehicle health condition or complete failure occurs.

Delays in detecting vehicle wheel impacts and/or the resulting stress on vehicle components can exacerbate the potential for a vehicle health condition or an existing vehicle health condition. Moreover, delays in detection can prevent identifying when and where the vehicle wheel impacts occurred such that other vehicles and road authorities cannot be made aware of contributing road conditions that impacted the vehicle wheel.

While impact by an external object on one or more vehicle wheels is described, it is to be understood that similar impacts on a vehicle body as a result of a road condition can result in a vehicle health condition that can be detected early by the example systems and methods.

FIG. 1 illustrates an example system 100 for detection of vehicle health conditions resulting from vehicle wheel impacts (i.e., impact to wheels 155 of a vehicle 101). The vehicle 101 can operate in an autonomous mode, a semi-autonomous mode, and/or a non-autonomous (i.e., manual) mode. An "autonomous mode" is defined as one in which each of vehicle propulsion, braking, and steering are controlled by a vehicle computer; in a "semi-autonomous" mode, the computer controls one or two of vehicle propulsion, braking, and steering; in a non-autonomous mode, a human operator controls each of vehicle propulsion, braking, and steering.

A vehicle 101 includes a computer 105 comprising a processor and a memory and a controller 108 comprising a controller processor and a controller memory. The computer 105 may include or be communicatively coupled to (e.g., via a vehicle communications network such as a communications bus as described further below) the controller 108 included in the vehicle. While only first and second computing devices, i.e., a computer 105 and a controller 108, are shown for ease of illustration, it is to be understood that vehicle 101 can include a plurality of each of computers 105 and controllers 108. Indeed, as further discussed below, controllers 108 are typically conventional electronic control units (ECUs) or the like, and a vehicle 101 typically includes a plurality of controllers 108, e.g., for respective components 120.

The computer 105 can be programmed to receive collected data 115 from one or more sensors 110 and/or controllers 108 to detect a wheel impact. In general, vehicle data 115 may include data about operation of the vehicle 101, e.g., data about one or more vehicle components 120, including wheels 155, as well as data about a location of the vehicle 101, data about an environment around a vehicle, data about an object outside the vehicle such as another vehicle, etc. A vehicle location is typically provided in a conventional form, e.g., geo-coordinates such as latitude and longitude coordinates obtained via a navigation system that uses the Global Positioning System (GPS). Further examples of data 115 can include measurements of vehicle systems and components, e.g., a vehicle velocity, a vehicle trajectory, etc.

Computing devices 105, 108 in the vehicle 101 are generally programmed for communications on a vehicle communications network, e.g., including a conventional vehicle communications bus. Via the network (such as a controller area network (CAN) or the like, bus, and/or other wired or wireless mechanisms (e.g., a wired or wireless local area network in the vehicle 101), devices 105, 108 may transmit messages to each other and/or to other various devices in a vehicle 101 and/or receive messages from the various devices, e.g., actuators, sensors 110, etc. Alternatively, or additionally, in cases where a device 105, 108 comprises multiple devices, the vehicle network may be used for communications between devices represented as the computer 105 or the controller 108 in this disclosure. In addition, the computer 105 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The data store 106 can be of any type, e.g., hard disk drives, solid state drives, servers, or any volatile or non-volatile media. The data store 106 can store the collected data 115 sent from the sensors 110.

A controller 108 is typically provided to monitor and/or control vehicle components 120 and the vehicle systems that include the respective component(s). For example, an engine control module (ECM) is used to control and/or monitor an engine, a transmission control module (TCM) is used to control and/or monitor a transmission, brake control module (BCM) may be used to control the vehicle brakes, etc. Further, as controllers become more sophisticated, various functions may be combined or integrated into a single controller. For example, a powertrain control module (PCM) may be used to control the engine and transmission. Similarly, a vehicle control module (VCM) may be used to control the engine, transmission, active suspension, power steering, ABS, and the like.

Sensors 110 can include a variety of devices, e.g., cameras, motion detectors, etc., i.e., sensors 110 to provide data 115 for evaluating a position of a component, evaluating a slope of a roadway, etc. The sensors 110 could, without limitation, also include short range radar, long range radar, LIDAR, and/or ultrasonic transducers. Further, various controllers 108 in a vehicle 101 may provide data 115 to computer 105 and controller 108 via the vehicle network or bus, e.g., data 115 relating to vehicle speed, acceleration, position, subsystem and/or component status, etc.

Collected data 115 can include a variety of data collected in a vehicle 101. Examples of collected data 115 are provided above, and moreover, data 115 are generally collected using one or more sensors 110, and may additionally include data calculated therefrom in the computer 105, and/or at the server 130. In general, collected data 115 may include any data that may be gathered by the sensors 110 and/or computed from such data. Collected data 115, such as illustrated in Table 1 below, typically describes operation of the vehicle 101. That is, collected data 115 typically describes a characteristic or attribute of the vehicle 101 and/or a vehicle component 120 thereof while the vehicle 101 is moving on a roadway, has an ignition status of ON, etc. Table 1 below lists examples of collected data 115, e.g., typically available from a vehicle controller area network (CAN) bus or the like, along with notation used herein for the data 115:

TABLE 1

| Data | Definition | Notation |
|---|---|---|
| Acceleration | Acceleration, i.e., first derivative of a velocity vector of the vehicle. | $a_{total}$ |
| Longitudinal acceleration | Acceleration along, i.e., in a direction defined by, a longitudinal axis (i.e., running from front to rear) of a vehicle | $a_x$ |
| Lateral acceleration | Acceleration along a lateral axis of a vehicle (i.e., an axis perpendicular to the longitudinal axis) | $a_y$ |
| Vertical acceleration | Acceleration along a vertical axis of a vehicle (i.e., an axis perpendicular to a plane defined by the longitudinal and lateral axes) | $a_z$ |
| Vehicle speed (or velocity) | Speed of the vehicle, at any given instant measured as if the vehicle is proceeding in a direction of the longitudinal axis; a velocity vector includes speed and a directional component. | V |
| Yaw rate | Angular velocity of the vehicle about the vertical axis | $\varphi$ |
| Roll rate | Angular velocity of the vehicle about the longitudinal axis | $\Phi$ |
| Pitch rate | Angular velocity of the vehicle about the lateral axis | |
| Brake torque | Force applied at a brake wheel to slow or stop the wheel | $brk_{trq}$ |
| Accelerator pedal position | Position (typically an angular position, i.e., an angle of rotation) of an accelerator or throttle control typically expressed with reference to a zero or undepressed position, i.e., zero is undepressed and 100% is fully depressed. | AP |
| Steering angle | Angle between a longitudinal axis of a vehicle a longitudinal axes of steered wheels (can be expressed as a negative angle when to left, and positive when to the right, or vice versa). | SA |
| Ignition status | Specifies whether the vehicle ignition is ON or OFF, i.e., typically a binary variable. | IS |

TABLE 1-continued

| Data | Definition | Notation |
|---|---|---|
| RCM signals | Signals or data from an RCM (restraint control module), e.g., indicating deployment of a passive restraint device such as an airbag. | RCM |
| Wheel speed front left | Wheel speed of the vehicle's front left wheel, measured in linear speed units, e.g., kilometers per second, obtained by multiplying wheel diameter, $\pi$, and revolutions per unit of time, e.g., second, e.g., $W_{FL} = \pi*d*rps$. | $W_{FL}$ |
| Wheel speed front right | Wheel speed of the vehicle's front right wheel. | $W_{FR}$ |
| Wheel speed rear left | Wheel speed of the vehicle's front right wheel. | $W_{RL}$ |
| Wheel speed rear right | Wheel speed of the vehicle's front right wheel. | $W_{RR}$ |

The vehicle 101 can include a plurality of vehicle components 120, as mentioned above. In this context, each vehicle component 120 includes one or more hardware components adapted to perform a mechanical function or operation—such as moving the vehicle 101, slowing or stopping the vehicle 101, steering the vehicle 101, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a suspension component, a brake component (as described below), a park assist component, an adaptive cruise control component, an adaptive steering component, a movable seat, a vehicle body, and the like. It will be noted that under this definition, wheels 155 are a vehicle component 120; the wheels 155 are assigned a separate reference number to better support the description that follows.

The system 100 can further include a network 125 connected to a server 130 and a data store 135. The computer 105 can further be programmed to communicate with one or more remote sites such as the server 130, via the network 125, such remote site possibly including a data store 135. The network 125 represents one or more mechanisms by which a vehicle computer 105 may communicate with a remote server 130. Accordingly, the network 125 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

The vehicle 101 includes a plurality of wheels 155, e.g., four wheels 155. The wheels 155 can support a vehicle body and allow the vehicle 101 to move along a roadway or the like. Each wheel 155 has a respective wheel speed sensor 110. The wheel speed sensor 110 detects rotation of the wheel 155 and outputs a rotational speed thereof. Wheel speed can then be determined as defined above.

Figure 2:
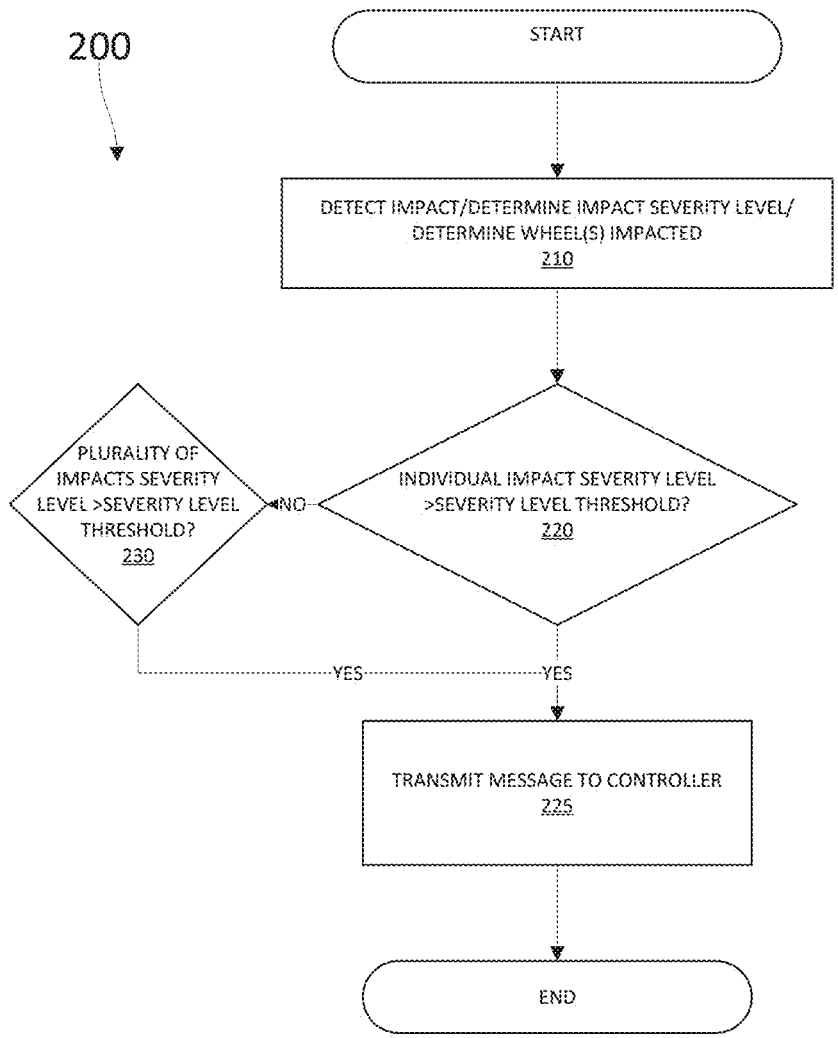
FIG. 2 illustrates an exemplary process for early detection of vehicle health conditions resulting from vehicle wheel impacts.

Referring now to FIG. 2, an exemplary process 200 for detection of a vehicle health condition is illustrated. The process 200 is described herein as carried out by (i.e., program instructions for the process 200 could be stored in a memory and executable by a processor of) computer 105. Process 200 for early detection of a vehicle fault condition begins in a block 210 with computer 105 detecting a wheel impact, determining a severity level of the detected wheel impact, and determining the specific wheel(s) impacted. For example blocks 405, 410, 415, and 420 of process 400 (FIG. 4), blocks 905, 910, and 915 of process 900 (FIG. 9), and/or blocks 1010, 1015, 1020, 1025, 1030, 1035, 1040, and 1045 of process 1000 (FIG. 10), described below, can be carried out to detect a wheel impact, determine a severity level of the detected wheel impact, and/or determine the specific wheel(s) impacted.

Process 200 then continues in decision block 220 wherein computer 105 determines whether the severity level (as determined, for example, as described below with respect to block 415 of process 400, blocks 905, 910, and 915 of process 900, and/or block 1010 of process 1000) of an individual wheel impact exceeds a severity level threshold. For example, the computer 105 could compare the severity level of an individual wheel impact to the severity level threshold. If the computer determines that the severity level of an individual vehicle wheel impact exceeds the severity level threshold, the process 200 proceeds to a block 225. Otherwise, the process 200 proceeds to a decision block 230.

In decision block 230, the computer 105 determines whether the severity level of a plurality of wheel impacts exceeds the severity level threshold. In this context, the "severity level of a plurality of wheel impacts" can be the total wheel impact count" (TC), and the severity level threshold can be a total wheel impact count threshold. The computer 105 could compare the total wheel impact count to the total wheel impact count threshold. As explained above, the total wheel impact count (TC) takes into account a number or count of wheel impacts at respective severity levels, the number of vehicle wheel impacts at each severity level being weighted to assign greater weight to vehicle wheel impacts at higher severity levels. Also as explained above, the total wheel impact count (TC) can be determined, as described, for example, in block 1045 of process 1000 (FIG. 10) or as part of processes 400 and/or process 900. Once the computer determines that the severity level of a plurality of wheel impacts exceeds the severity level threshold, the process 200 proceeds to block 225. Otherwise, the process 200 returns to the start of process 200.

In the block 225, the computer 105 transmits a message, e.g., via a CAN bus, for receipt by one or more controllers 108 for a vehicle component 120 via the vehicle communications network specifying that a vehicle wheel impact has been detected. The message includes the severity level of the wheel impact and the identity of the specific wheel(s) impacted (e.g., right front, right rear, etc.). The message could also specify an adjustment to one or more vehicle components 120 to be made based on the detected impact and/or severity. The message can also include the detected impact cause.

Next, in a block 235, one or more controllers 108 receive the message transmitted in the block 225 and determine and typically implement an adjustment to a vehicle component 120 controlled by the respective controller 108. Determining and implementing an adjustment is discussed in further detail below concerning the process 300.

Figure 3:
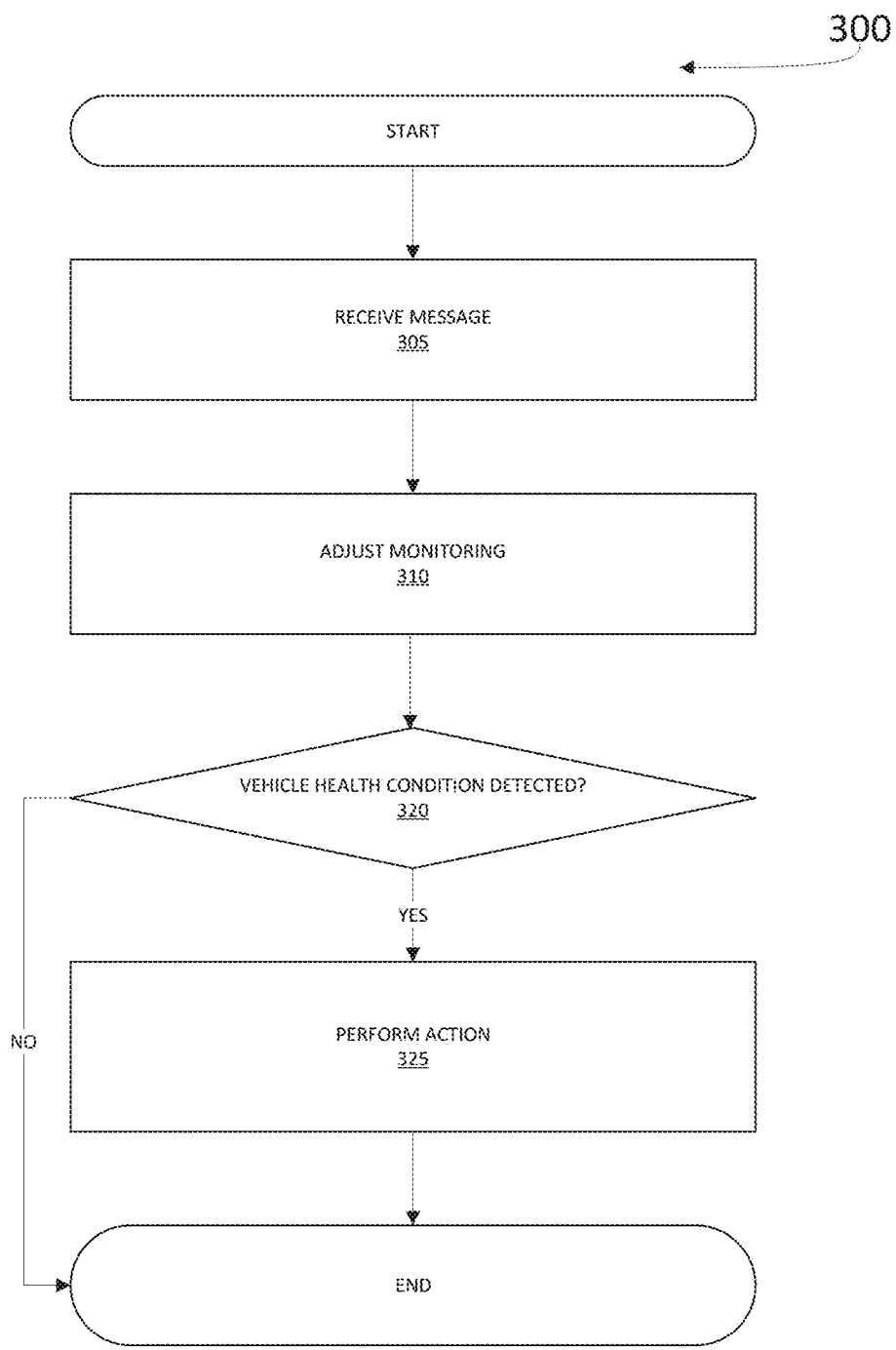
FIG. 3 illustrates an exemplary process for adjusting monitoring of a vehicle component based on detected vehicle wheel impacts.

FIG. 3 illustrates a process 300 for adjusting monitoring and/or operation of a vehicle component based on detecting a vehicle wheel impact that exceeds a severity level threshold. The process 300 could be carried out by executing program instructions in a controller or controllers 108.

Process 300 begins in block 3005. In the block 305, the controller receives the message from the computer 105, e.g., as described above concerning the block 225 of the process 200.

Next, in a block 310, the controller 108 adjusts (i.e., makes an adjustment to) monitoring and/or operation of the vehicle component 120 in response to the message. An adjustment to a component 120 can be made based on a specific wheel or wheels 155 (e.g., right front, left rear, etc.) impacted and/or a severity of a wheel 155 impact. Impact cause can also be considered. The adjustment(s) can be stored in the computer 105 and provided in the message referenced above and/or could be stored in a memory of the respective controller 108. Adjustments could be determined based on design information or empirical data specifying components 120 that could be damaged and/or rendered inoperable based on wheel 155 impacts. As a non-limiting example, adjustments could be determined based on the output from a cloud-based Deep Neural Network (DNN) such as further described below in connection with FIGS. 5 through 9, where the input data 115 (described below) for training the DNN is obtained from other vehicle(s) of the same make and model in which a vehicle health condition resulting from a wheel impact (of substantially the same severity level, specific wheel impacted, and/or predicted impact cause) has been detected.

In general, component 120 adjustments could fall into one of three categories. In a first category of adjustment, a controller 108 could be programmed to reduce what can be referred to as a fault maturation time, which is an amount of time specified for the controller 108 to detect data values for the component 120 indicative of a health condition. To provide just one example, a controller 108 for a tire pressure monitoring component 120 could be programmed to specify a change in tire pressure after detecting a tire pressure drop below a specified threshold for a specified amount of time. An adjustment could include reducing the amount of time for detecting reduced tire pressure, i.e., a reduced fault maturation time, to indicate a possible tire pressure health condition (i.e., in this example, loss of tire pressure).

In another example, the fault maturation time could be reset. For example, a controller 108 could be programmed to accumulate data, e.g., tire pressure data, over time, and to report a component 120 value, e.g., tire pressure, based on averaging the data over time. A controller 108 could, upon being informed of a wheel 155 impact at or above a specified severity level, be programmed to reset a fault maturation time to zero, including resetting an accumulated average or other statistical value to zero. The purpose of such reset could include limiting the controller 108 to evaluating data to a time after a wheel 155 impact event, i.e., a time after a vehicle component 120 could have been affected by the wheel 155 impact.

In a second category of adjustment, a controller 108 could alternatively or additionally be programmed to adjust a monitoring parameter. A monitoring parameter, in this context, is a data value that governs receipts and/or analysis of data from component 120 operation. To name just a few examples, a tire pressure, and engine speed, and a brake pressure could all be monitoring parameters. (Table 1 above contains further examples of data values that could be monitoring parameters.) Alternatively or additionally, a rate of data monitoring or sampling could be adjusted.

In the case of a monitoring parameter threshold, a controller 108 could be programmed to determine a health condition (e.g., a fault) upon determining that a monitoring parameter exceeds or, as the case may be, falls below, a specified threshold. Upon a message indicating a wheel 155 impact and/or a severity thereof, a controller 108 could be programmed to adjust the specified threshold, e.g., to increase a range of values above or below the threshold, i.e., to increase sensitivity of the controller to a possible health condition, i.e., by adjusting the threshold so that a health condition is more likely to be reported. Again, using the example of a tire pressure monitoring system component 120, a controller 108 could be programmed to by default report a possible tire pressure health condition when a tire pressure drops by a first threshold amount, e.g., three pounds per square inch (p.s.i.). However, after detecting a wheel 155 impact and/or severity thereof, the relevant controller 108 could be programmed to adjust the threshold to two p.s.i.

Alternatively or additionally, in the case of a monitoring parameter governing a data sampling or data acquisition rate, sometimes referred to as a data refresh rate, the data acquisition rate parameter (or refresh rate) could be changed (typically increased) after a wheel 155 impact event.

In a third category of adjustment, a controller 108 could alternatively or additionally be programmed to modify operation of a component 120. For example, after detecting a wheel 155 impact and/or severity thereof, the relevant controller 108 could be programmed to modify operation of a component better to provide data to diagnose a health condition. For example, a controller 108 for a brake system component 120 could be programmed to apply a brake pressure to a caliper for a wheel 155 suffering from an impact to provide data to determine whether a brake component 120 was damaged by a wheel 155 impact. A controller 108 for a steering wheel component could be programmed to determine the extent of misalignment of a steering wheel position angle resulting from the wheel impact.

Table 2 below provides examples of components 120 whose controllers 108 could make various adjustments in one, two, or three of the categories discussed above.

TABLE 2

| Component | Possible Adjustment |
|---|---|
| Anti-lock braking system (ABS) | Monitor wheel speed sensor(s) of wheel(s) 155 affected by impact for possible damage to the sensor(s) |
| Anti-lock braking system (ABS) | Initiate monitoring of, or increase frequency of monitoring, of wheel speed sensor(s) data of wheel(s) 155 affected by impact for wheel vibration |
| Anti-lock braking system (ABS) | Initiate monitoring of, or increase frequency of monitoring, of wheel speed sensor(s) data of wheel(s) 155 affected by impact for rapid tire deflation/loss of tire pressure via increased rotation due to decreased tire radius |
| Anti-lock braking system (ABS) | Apply slight brake pressure to brake caliper of wheel(s) 155 affected by impact to verify no damage or damage to brake system and monitor vehicle 105 response |
| Tire Pressure Monitoring System (TPMS) | Increase read rate of tire pressure sensor data for wheel(s) 155 affected by impact |
| Tire Pressure Monitoring System (TPMS) | Decrease threshold for allowable pressure deviation for wheel(s) 155 affected by impact |
| Power Steering Control Module (PSCM) | Initiate monitoring of, or increase frequency of monitoring, for vibrations, including steering wheel angle, steering wheel rate, and/or steering wheel jerk for signs of wheel vibration |
| Power Steering Control Module (PSCM) | Initiate monitoring of, or increase frequency of monitoring, for torque, including steering wheel torque, steering assist motor current, vehicle yaw rate, and/or vehicle 105 acceler- |

TABLE 2-continued

| Component | Possible Adjustment |
|---|---|
| | ation for signs of increased steering torque to maintain course |
| Power Steering Control Module (PSCM) | Initiate monitoring of, or increase frequency of monitoring, for steering wheel angle for evidence of a crooked steering wheel (e.g., bent suspension component resulting in crooked steering wheel to drive straight) |
| Body Control Module (BCM) | Initiate monitoring of, or increase frequency of monitoring, of coolant overflow bottle level to detect coolant leaks |
| Body Control Module (BCM) | Initiate monitoring of, or increase frequency of monitoring, of washer fluid bottle level to detect washer leaks |
| Body Control Module (BCM) | Initiate monitoring of, or increase frequency of monitoring, of fuel level change rate to detect fuel leaks |
| Infotainment System | Initiate monitoring of, or increase frequency of monitoring, of internal or external microphones for presence of new noises |

Next, in a decision block 320, the computer 105 determines whether a vehicle 101 health condition is detected as a result of monitoring. For example, the computer can compare various data 115 to respective thresholds to determine whether a vehicle 101 health condition is indicated. If a vehicle 101 health condition is detected, the process 1000 proceeds to a block 1025. Otherwise, the process 1000 ends following decision block 1020.

Next, in block 325 of process 300, the controller can perform an action in response to detection of a vehicle 101 health condition. For example, once a vehicle 101 health condition is detected, the controller could be programmed to actuate a vehicle communications component 120, e.g., a wireless transceiver communicating via the network 125, to transmit a message via a vehicle HMI (human machine interface, e.g., including a touchscreen display) and/or via the network 125 to the computer 105, the server 130, or a user device, to trigger a diagnostic trouble code (DTC) and/or that vehicle maintenance is recommended. Further, the controller 108 could be programmed to take an additional action or an alternative action. For example, the controller 108 could be programmed to modify operation of the vehicle 101 so that the vehicle can continue its intended path, e.g., control propulsion and/or brake components 120 to limit vehicle 101 speed to a predetermined threshold. Further non-limiting examples of ways in which the controller can be programmed to modify operation of the vehicle 101 so that the vehicle can continue its intended path include programming a steering controller 108 to control steering components 120 by recalibrating a steering wheel position angle based on a detected misalignment. For example, a steering wheel controller can be recalibrated to a new zero baseline in order to offset the wheel misalignment. A controller 108 could be programmed to control the position of a throttle valve based on a detected wheel impact, etc. A controller 108 could actuate a valve to extract air from one or more tires for wheel(s) 155 affected by impact. Yet further, if a vehicle 101 is capable of autonomous or semi-autonomous operation, the controller could be programmed to operate a vehicle to a safe stop, e.g., on a road shoulder, and a parking lot, etc., upon determining that a vehicle health condition exceeded a predetermined threshold. The process 300 ends following block 325.

Data Threshold Based Determination

Figure 4:
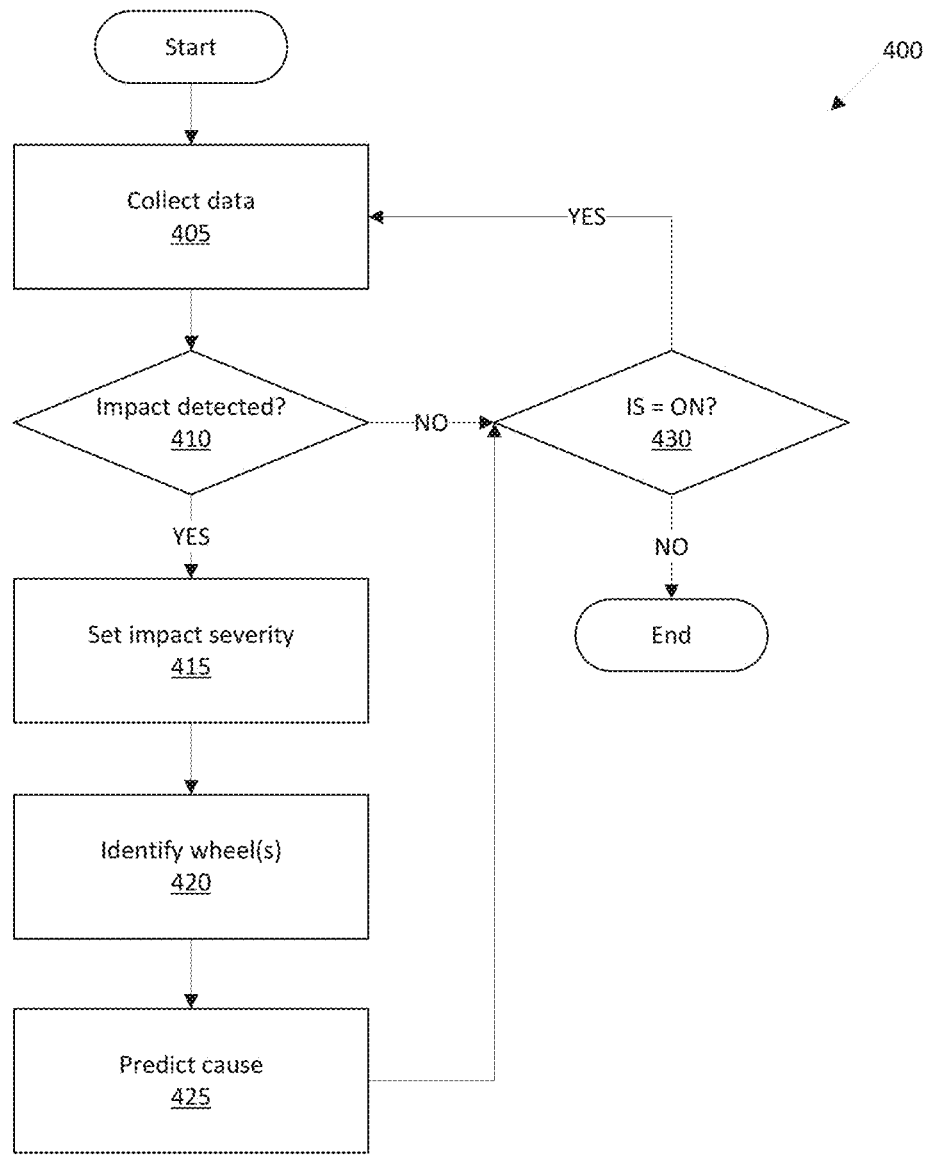
FIG. 4 illustrates an exemplary data threshold-based determination process for identifying (i.e., detecting) a wheel impact and determining a severity of the impact by determining whether values in collected data meet various thresholds.

FIG. 4 illustrates an exemplary process 400 for detecting a wheel impact and determining a severity of the impact by determining whether values in collected data 115 meet various thresholds. The process 400 can be referred to as a threshold-based algorithm, meaning that the process 400 compares various data 115 to respective thresholds to determine a wheel impact. The process 400 can be carried out according to instructions in a computer 105. The process 400 can be practiced on its own. Moreover, as discussed further below concerning FIG. 10, threshold-based impact determination can be practiced in combination with DNN-based determination (discussed further below with respect to FIGS. 5-9).

The process 400 begins in a block 405, in which data 115 is obtained, e.g., data such as shown in Table 1, is received, e.g., via a vehicle network such as a CAN bus. The data 115 is stored according to a timestamp indicating a time step at which the data was received; typically, data for four or more time steps is accumulated before the process 400 proceeds to the block 410. Further, for a timestep k, the notation W⁻ refers to an immediately prior, i.e., k−1, timestep, W⁻ refers to a k−2 timestep, etc. In one example implementation, each time step is 10 milliseconds (ms).

Next, in a decision block 410, the computer 105 determines whether various data 115 meets one or more respective thresholds indicating a wheel impact, i.e., an application of force to a wheel 155 severe enough to potentially stress the wheel 155, has occurred. For example, the computer 105 could evaluate the following expression (1):

$V_x > V_{min}$

AND $((|V_x - W_{FL}| \text{ OR } |V_x - W^-_{FL}| \text{ OR } |V_x - W^=_{FL}| \text{ OR } |V_x - W^\equiv_{FL}|) \geq \beta * V_x)$

AND $((\Delta W_{FL} \text{ OR } \Delta W^-_{FL} \text{ OR } \Delta W^=_{FL}) \geq \delta_W \text{ OR } (\varphi \geq \varphi_{min} \text{ AND } \Delta\varphi \geq \delta_\varphi))$.

Notations in the above expression have the meanings set forth in Table 1. Other notations have meanings as set forth in Table 3:

TABLE 3

| Notation | Meaning |
|---|---|
| $V_{min}$ | A minimum velocity threshold for making wheel impact determinations, e.g., empirically determined as a minimum velocity at which meaningful wheel impact determinations can be made. |
| B | An empirically determined constant, e.g., vehicle wheels can be subjected to impact and a vehicle speed $V_x$ adjusted by the constant β to satisfy the above relation. |
| ΔW | Change in wheel speed from an immediately preceding timestep. |
| $\delta_W$ | A minimum threshold change in wheel speed from an immediately prior timestep, e.g., empirically determined by subjecting wheels to specified impacts and noting wheel speed changes. |
| $\varphi_{min}$ | A minimum yaw rate threshold for making wheel impact determinations, e.g., empirically determined as a minimum yaw rate at which a wheel impact could be indicated. |
| $\delta_\varphi$ | A minimum threshold change in yaw rate from an immediately prior time step, e.g., empirically determined by subjecting wheels to specified impacts and noting wheel speed changes. |

Expression (1) above evaluates to TRUE or FALSE (or "1" or "0"), the above example providing an evaluation for a wheel speed $W_{FL}$ of a front left wheel 155. Typically, the computer 105 in the block 410 evaluates conditions, e.g., according to the expression (1), for other wheels 155, e.g., wheel speeds $W_{FR}$, $W_{RL}$, $W_{RR}$. Thus, if the expression (1) evaluates to "true" for one or more of the wheels 155, then a determination is made in the block 410 that a wheel impact is detected. Further, the computer 105 can store data specifying which of the one or more wheels 155 for which an impact is detected. Yet further, if a wheel impact is detected for two or more wheels 155, then the blocks 415, 420, 425 described below could then be executed, e.g., in parallel or sequence or substantially at the same, for each of the wheels 155 for which an impact is detected. With understanding, for convenience, the blocks 415, 420, 425 will be described with respect to a single wheel 155. In any event, upon a determination that a wheel impact is detected, the process 400 proceeds to the block 415. Otherwise, the process 400 proceeds to a block 440.

In the block 415, the computer 105 determines an impact severity for the wheel 155 determined in the block 410 to have experienced an impact. An impact severity describes a degree of significance or severity of a wheel impact. The impact severity can be quantified, e.g., expressed according to a numeric scale. In Table 4 below, which provides an example of conditions that can be applied by the computer 105 to determine impact severity, the impact severity is ranked on a scale of zero to five. Units of acceleration in the below table are standard gravities, sometimes notated "G" or "g." The expression $b_{lim}$ refers to an empirically established brake torque limit, e.g., by subjecting wheels to specified impacts and noting brake torques.

TABLE 4

| Condition | Impact Severity |
|---|---|
| $a_{total} \geq 4$ OR (($a_x \geq 3.5$ OR $a_y \geq 3.5$ OR $a_z \geq 3.5$) | 5 |
| $a_{total} \geq 3$ OR (($a_x \geq 2.5$ OR $a_y \geq 2.5$ OR $a_z \geq 2.5$) | 4 |
| $a_{total} \geq 2$ OR (($a_x \geq 1.5$ OR $a_y \geq 1.5$ OR $a_z \geq 1.5$) | 3 |
| $a_{total} \geq 1$ OR (($a_x \geq .75$ OR $a_y \geq .75$ OR $a_z \geq .75$) | 2 |
| $a_{total} \geq 0.5$ AND ($brk_{trq} \leq b_{lim}$) | 1 |
| Above conditions all fail | 0 (no impact) |

Next, in a block 420, the computer 105 identifies specific wheels 155 for which respective impact severities have been determined. The block 420 may be omitted where an impact has been determined for only one wheel 155, i.e., in that case, the wheel for which the impact severity was determined in the block 415 is already known. However, where there are two or more wheels 155 for which an impact was detected in the block 410, the computer 105 can store and impact severity is determined in the block 415 for each of the wheels 155.

Next, in a block 425, the computer 155 evaluates conditions to predict a cause of a detected impact. Note that $a_{zmin}$ is an empirically determined minimum acceleration threshold, e.g., determined based on empirical testing as a vertical acceleration likely to be associated with a wheel impact. Further, it will be noted distinguishing positive and negative roll rates and accelerations (the negative sign typically indicating a left angle of rotation or an upward direction of acceleration can help distinguish a type of cause, and location of the cause, of an impact, e.g., as shown in Table 5.

TABLE 5

| Condition | Predicted Impact Cause |
| --- | --- |
| $\Phi \geq \Phi_{min}$ AND $a_z \geq a_{zmin}$ | Bump on left side of vehicle |
| $\Phi \geq \Phi_{min}$ AND $a_z \leq -a_{zmin}$ | Pothole on right side of vehicle |
| $\Phi \leq -\Phi_{min}$ AND $a_z \geq a_{zmin}$ | Bump on right side of vehicle |
| $\Phi \leq -\Phi_{min}$ AND $a_z \leq -a_{zmin}$ | Pothole on left side of vehicle |

The block 430 can be executed following either the blocks 405 or 425. In the block 430, the computer 105 determines whether to continue the process 400. For example, as illustrated in the representation of the block 430 in FIG. 4, the computer 101 could determine whether the vehicle 101 ignition is ON (or OFF). Alternatively, or additionally, the computer 105 could be powered off, user input disabling impact detection could be received, etc. If the ignition is powered off, or the process 400 is otherwise not to continue, then the process 400 ends following the block 430; otherwise, the process 400 returns to the block 405. Block 425 and decision block 430 may be omitted in the execution of process 200.

Deep Learning Determination

Figure 5:
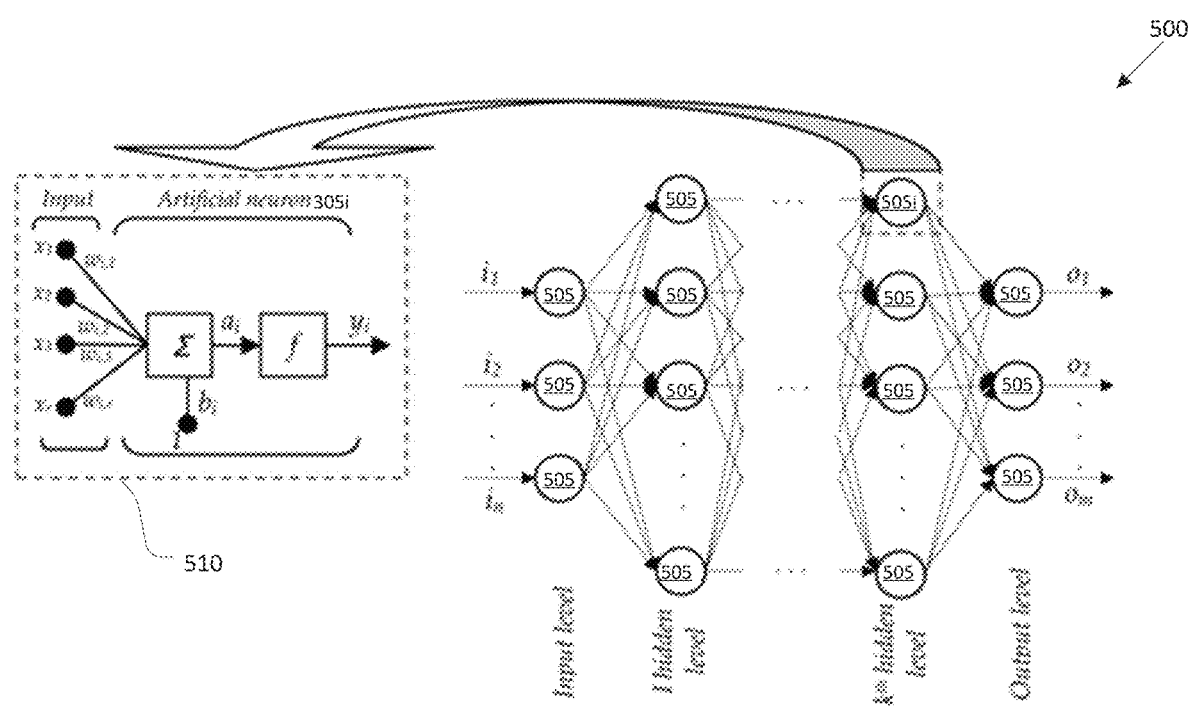
FIG. 5 is a diagram of an example deep neural network (DNN).

FIG. 5 is a diagram of an example deep neural network (DNN) 500. The DNN 500 can be a software program that can be loaded in memory and executed by processor included in computer 105, for example. The DNN 500 can include n input nodes 505, each accepting a set of inputs i (i.e., each set of inputs i can include on or more inputs x). The DNN 500 can include m output nodes (where m and n may be, but typically are not, a same number) provide sets of outputs $o_1 \ldots o_m$. The DNN 500 includes a plurality of layers, including a number k of hidden layers, each layer including one or more nodes 505. The nodes 505 are sometimes referred to as artificial neurons 505, because they are designed to emulate biological, e.g., human, neurons. The neuron block 510 illustrates inputs to and processing in an example artificial neuron 505i. A set of inputs $x_1 \ldots x_r$ to each neuron 505 are each multiplied by respective weights $w_{i1} \ldots w_{ir}$, the weighted inputs then being summed in input function $\Sigma$ to provide, possibly adjusted by a bias $b_i$, net input $a_i$, which is then provided to activation function $f$, which in turn provides neuron 505i output $y_i$. The activation function $f$ can be a variety of suitable functions, typically selected based on empirical analysis. As illustrated by the arrows in FIG. 5, neuron 505 outputs can then be provided for inclusion in a set of inputs to one or more neurons 505 in a next layer.

The DNN 500 can be trained to accept as input data 115, e.g., from the vehicle 101 CAN bus as illustrated in Table 1 above, and to output an impact severity, and identified impacted wheel 155, and/or a predicted impact cause. The DNN 500 can be trained with ground truth data, i.e., data about a real-world condition or state. Weights w can be initialized by using a Gaussian distribution, for example, and a bias b for each node 505 can be set to zero. Training the DNN 500 can including updating weights and biases via conventional techniques such as back-propagation with optimizations. Example initial and final (i.e., after training) parameters (parameters in this context being weights w and bias b) for a node 505 in one example were as follows:

TABLE 6

| Parameters | Initial value | Final value |
| --- | --- | --- |
| $w_1$ | 0.902 | −0149438 |
| $w_2$ | −0.446 | −0.0103792 |
| $w_3$ | 1.152 | 0.00850074 |
| $w_r$ | 0.649 | 0.00349599 |
| $b_i$ | 0 | 0.00241366 |

A set of weights w for a node 505 together are a weight vector for the node 505. Weight vectors for respective nodes 505 in a same layer of the DNN 500 can be combined to form a weight matrix for the layer. Bias values b for respective nodes 505 in a same layer of the DNN 500 can be combined to form a bias vector for the layer. The weight matrix for each layer and bias vector for each layer can then be used in the trained DNN 500.

In the present context, the ground truth data used to train the DNN 500 typically includes data 115 from a vehicle 101 CAN bus about a wheel 155 impact. For example, data 115 can be gathered from accelerometers mounted to vehicle suspension parts, e.g., spindle, shock tower, etc. The data 115 can then be labeled for training the DNN, i.e., tags identifying conditions such as an impact severity level (e.g., on a scale of 0 to 5 as discussed above), a predicted impact cause, a specific vehicle wheel (e.g., right front, right rear, etc.) that was impacted, etc.

Figure 6:
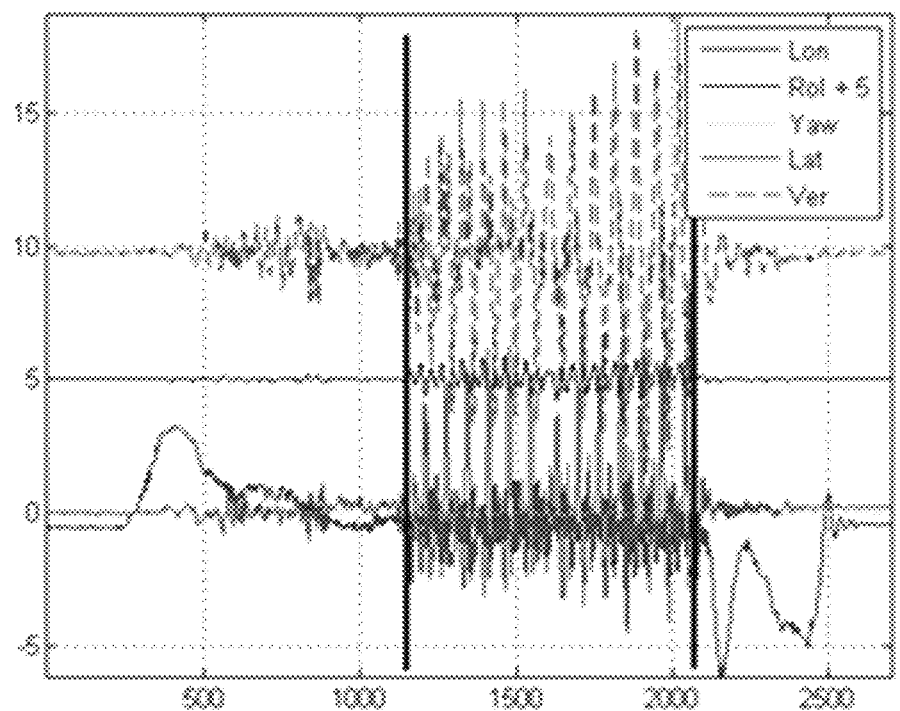
FIG. 6 illustrates an exemplary graph showing data that can be selected for labeling and training a DNN.
Figure 7:
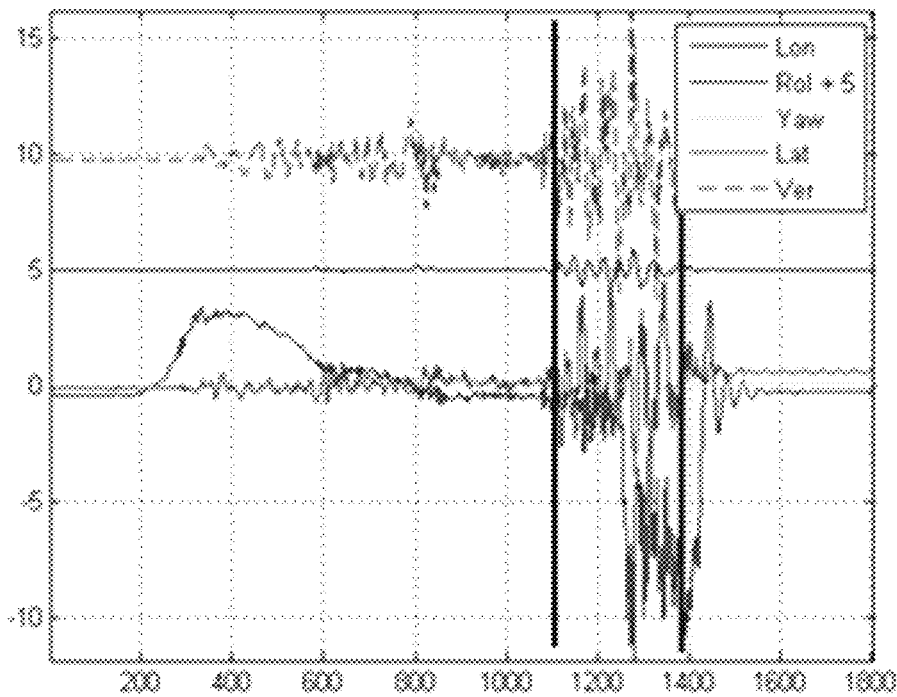
FIG. 7 illustrates another exemplary graph showing data that can be selected for labeling and training a DNN.

FIGS. 6 and 7 illustrate data 115 selected for labeling and training the DNN 500. The vertical or y-axes in the respective illustrated graphs show a normalized scale for various data 115, such as yaw rate data, longitudinal, lateral, and vertical acceleration, and a roll rate. The respective horizontal or x-axes represent time in milliseconds. As can be seen for certain periods of time in each graph, all data values noticeably oscillate between greater extremes than for other times in each graph, and the data for those certain times are empirically known to have been collected times of a wheel impact event. Thus, data 115 in these time periods can be selected for labeling and training the DNN 500.

Figure 8:
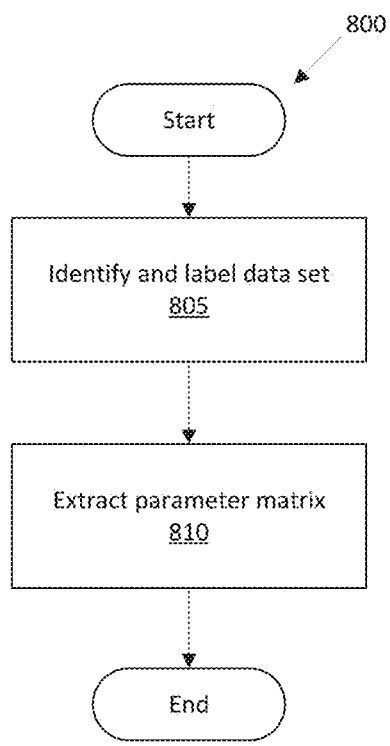
FIG. 8 illustrates a training process for a DNN.

FIG. 8 illustrates a training process 800 for a DNN 500. The process may begin in a block 805, in which a training data set, e.g., as discussed above concerning FIGS. 6 and 7, is identified and labeled. Then in a block 810, the DNN 500 is trained whereby a parameter matrix, e.g., including weights and biases as discussed above, can be determined. Then the process 800 ends.

Figure 9:
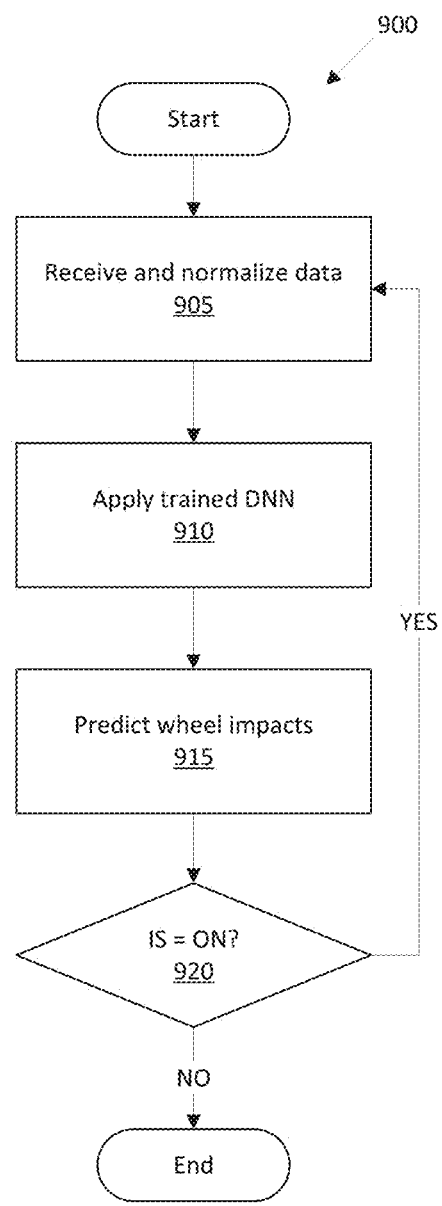
FIG. 9 illustrates a process by which a DNN can predict vehicle wheel impacts.

FIG. 9 illustrates an exemplary process 900 by which a DNN 500 predicts wheel impacts, including an impact severity level for a detected wheel impact. The process 900 can be practiced on its own. Moreover, as discussed further below concerning FIG. 9, DNN-based impact determination can be practiced in combination with threshold-based determination. DNN-based impact determination has the advantage over the threshold-based determination process 400 of being based on machine learning and therefore able to account for factors other than those explicitly included in inputs from data 115. Further, because the DNN 500 can be trained over time in a vehicle 101, the process 900 advantageously can be tailored to a specific vehicle 101 (or for vehicles 101 of a same make, model, model year, powertrain, engine, motor, and/or wheel diameter, etc.) and can change over time as a vehicle 101 changes, e.g., changes in tires, tire pressure, suspension stiffness, etc., can change detections on wheel impacts. Such changes would not be accounted for by the threshold-based determination of process 400, but are accounted for in the DNN 500, providing greater accuracy and reliability than the process 400. A further advantage that may be realized from the DNN 500 and the process 900 over threshold-based determination such as in process 400 is that, because threshold-based determination relies on data 115 with for multiple timesteps, if timestamps for data 115 are corrupted or otherwise inconsistent, especially over multiple timestamps, impact determinations from a threshold-based determination such as in the process 400 may be inaccurate, e.g., an impact may be determined where none in fact occurred, or an actual impact may not be detected, and/or an impact severity level may be improperly reported. Thus, confirming a detected impact and/or impact severity level with the DNN 500 in addition to threshold-based impact determination can advantageously increase a confidence level in an impact determination and/or impact severity level determination.

The process 900 may begin in a block 905, in which the computer 105 receives and normalizes data 115, e.g., vehicle 101 CAN bus data as described above and as illustrated in Table 1. Typically data 115 received in a predetermined time step, e.g., 10 ms (milliseconds), 100 ms, etc., can be analyzed by the computer 105 in substantially real time to determine a mean and standard deviation for the data 115, e.g., a vehicle yaw rate, a vehicle speed, a vehicle acceleration, etc., in the time step. Data values outside of a standard deviation can be ignored, and the data value provided to the DNN 500 can be normalized according to the mean data value for the time step.

Next, in a block 910, data received in normalized in the block 905 is input to the DNN 500 to obtain outputs identifying one or more wheel impacts. For example, as described above, outputs could include an impact severity level, and identified wheel 155 impacted, and/or a predicted cause of the wheel impact.

Next, in a block 915, the computer 105 analyzes the outputs obtained in the block 910 to determine if one or more wheel impacts are identified, e.g., one or more vehicle wheel impacts with an impact severity level greater than zero. Further, the computer 105 stores the wheel impact, e.g., according to a timestamp, and impact severity level, identified wheel 155 impacted, and/or predicted cause of the wheel impact.

Next, in a block 920, the computer 105 determines whether to continue the process 900. For example, as illustrated in the representation of the block 920 in FIG. 9, the computer 101 could determine whether the vehicle 101 ignition is ON (or OFF). Alternatively, or additionally, the computer 105 could be powered off, user input disabling impact detection could be received, etc. If the ignition is powered off, or the process 900 is otherwise not to continue, then the process 900 ends following the block 920; otherwise, the process 900 returns to the block 905.

Hybrid Determination

Figure 10:
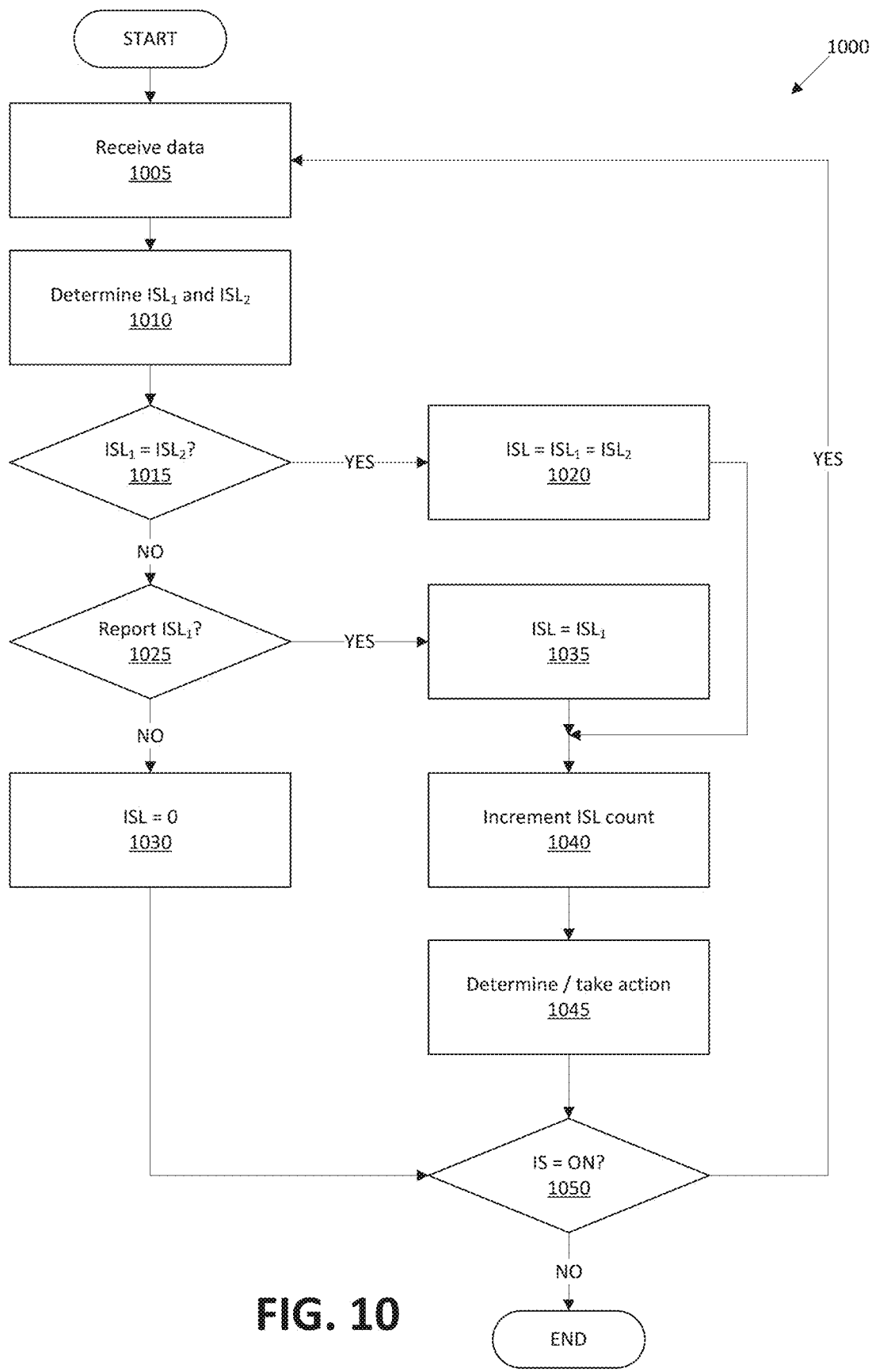
FIG. 10 illustrates an exemplary hybrid process for combining outputs of a threshold-based determination and a deep learning-based determination for detecting a vehicle wheel impact and determining a severity of the impact.

FIG. 10 illustrates an exemplary process 1000 for combining outputs of a threshold-based determination and a deep learning-based determination of a wheel impact. As mentioned above, DNN-based determination can have advantages over threshold-based determination. However, based on unreliability of individual items of data 115 from sensors 110, i.e., data 115 for a single timestep, data 115 for the DNN 500 can result in the DNN 500 providing false positives. Threshold-based determination, on the other hand, utilizes data 115 for multiple timesteps, and therefore while possibly less precise, can serve as a check on false positives from the DNN 500.

FIG. 10 can begin in a block 1005, e.g., after a vehicle 101 is powered on (e.g., ignition status equals ON) and/or placed into a drive mode. In the block 1005, the computer 105 receives data 115, e.g., as illustrated above in Table 1.

Next, in a block 1010, the computer 105 determines respective impact severity levels according to a threshold-based determination or algorithm, e.g., as discussed above concerning FIG. 4, and a DNN based determination, e.g., as discussed above concerning FIGS. 5-9. For convenience in the figures, the threshold based determined impact severity level is referred to as $ISL_1$ and the DNN based determined impact severity level is referred to as $ISL_2$. Typically, the respective impact severity levels will have been determined according to a same scale, e.g., the scale of 0 to 5 discussed above. However, as should be clear from the above, but for the sake of clarity, note that a first set of data 115 input to the threshold based algorithm and a second set of data input to the DNN 500 may include data elements in common, e.g., vehicle velocity, acceleration, etc., but likely will include differing data elements. That is, a first set of data input to the threshold-based algorithm may include data elements not provided to the DNN 500, i.e., not in the second set of data. Alternatively, or additionally, a second set of data input to the DNN 500 may include data elements not provided to the threshold-based algorithm, i.e., not in the first set of data.

Next, in a decision block 1015, the computer 105 determines whether $ISL_1$ and $ISL_2$ are the same. If so, the process 1000 proceeds to a block 1020. Otherwise, the process 1000 proceeds to a decision block 1025.

In the block 1020, which may follow the block 1015, the computer 105 stores a record of a wheel impact, e.g., according to a timestamp and indicating the impact severity level determined according to $ISL_1$ and $ISL_2$, possibly along with other data including an affected wheel 155 and/or a predicted cause of the wheel impact. Following the block 1020, the process 1000 proceeds to a block 1040.

In the decision block 1025, which may follow the block 1015, the computer 105 determines whether a condition or conditions are met so that the impact severity level determined by the threshold-based determination should be reported or stored. For example, the computer 105 could be programmed to determine whether the following expression (2) evaluates to TRUE:

$$a_{total} \geq k*f(v)*g \text{ AND } ISL_1 > 0.$$

where g is a value for one standard gravity, k is a constant that can be empirically determined, e.g., by test driving, to relate total acceleration to speed, and f(v) is velocity or some function of velocity. If the condition or conditions specified for reporting the threshold-based determination are met, e.g., expression (2) evaluates to true, then the process 1000 proceeds to a block 1035. Otherwise, the process 1000 proceeds to a block 1030.

In the block 1030, the computer 105 stores a record of wheel impacts with an impact severity level of zero, or alternatively, simply stores no wheel impact. Following the block 1030, the process 1000 proceeds to a decision block 1050.

In the block 1035, which may follow the block 1025, the computer 105 stores a record of a wheel impact, e.g., according to a timestamp and indicating the impact severity level determined according to $ISL_1$, possibly along with other data including an affected wheel 155 and/or a predicted cause of the wheel impact. Following the block 1035, the process 1000 proceeds to a block 1040.

In the block 1040, the computer 105 increments one or more counters that each store a number of incidents of wheel impacts, e.g., at respective impact severity levels and since the counters were last reset, e.g., by a technician providing input to the computer 105 during a maintenance event.

Next, in a block 1045, the computer 105 determines whether to take action, i.e., actuate or control one or more vehicle 101 components 120, based on respective values of the one or more counters. For example, the computer 105 determines a "total wheel impact count" TC according to a formula that takes into account a number or count of wheel impacts at respective severity levels (the respective counts each denoted below as $C_{IsLn}$), the number of vehicle wheel impacts at each severity level being weighted to assign greater weight to vehicle wheel impacts at higher severity levels. The weights could be determined according to a linear formula or some other formula to account for increasing import of increasing severity levels, e.g., in the example below the weights could increase linearly from a value of 0.2 for $W_1$ to 1 for $W_5$.

$$TC = W_1 * C_{ISL1} + W_2 * C_{ISL2} + W_3 * C_{ISL3} + W_4 * C_{ISL4} + W_5 * C_{ISL5}.$$

For example, where the total impact event count TC exceeds a predetermined count threshold, the computer 105 could be programmed to take a specified action. For example, once a total impact event count TC exceeds, e.g., a value of 10, the computer 105 could be programmed to actuate a vehicle 101 communications component 120, e.g., a wireless transceiver communicating via the network 125, to transmit a message via a vehicle 101 HMI (human machine interface, e.g., including a touchscreen display) and/or via the network 125 to the server 130 or a user device, that vehicle 101 maintenance is recommended. Further, the computer 105 could be programmed to take a plurality of actions based on a respective plurality of predetermined count thresholds. For example, in addition to being programmed to indicate maintenance once a first threshold is exceeded, the computer 105 could be programmed to modify operation of the vehicle 101, e.g., control propulsion and/or brake components 120 to limit vehicle 101 speed to a predetermined threshold, once a second threshold is met or exceeded, e.g., a TC count of 50.

Yet further for example, the computer 105 could compare individual impact severity counts to respective thresholds and then take action based on a result of such comparison. For example, the computer 105 could be programmed to provide a message recommending maintenance if a count $C_{ISL5}$ was 1 or more, or if a count $C_{ISL4}$ was 2 or more. Likewise, the computer 105 could be programmed to limit vehicle speed, e.g., to 20 km/h, 30 km/h, etc., if a count $C_{ISL5}$ was 1 or more, if a count $C_{ISL4}$ was 2 or more, or if a count $C_{ISL3}$ was 3 or more. Yet further, if a vehicle 101 is capable of autonomous or semi-autonomous operation, the computer 105 could be programmed to operate a vehicle to a safe stop, e.g., on a road shoulder, and a parking lot, etc., upon determining that, e.g., $C_{ISL5}$ exceeded 1, or TC a exceeded a predetermined threshold, e.g., 5.

Note that the blocks 1040, 1045 could also be executed as part of processes 400, 900, described above. That is, if either of threshold-based determination or DNN based determination of wheel impacts are performed alone, one or more counters may be incremented and a Total Count (TC) determined.

The decision block 1050 may follow either of the blocks 1030, 1045. In the block 1050, the computer 105 determines whether to continue the process 1000. For example, as illustrated in connection with FIG. 9, the computer 101 could determine whether the vehicle 101 ignition is ON (or OFF). Alternatively, or additionally, the computer 105 could be powered off, user input disabling impact detection could be received, etc. If the ignition is powered off, or the process 1000 is otherwise not to continue, then the process 1000 ends following the block 1050; otherwise, the process 1000 returns to the block 1005.

CONCLUSION

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

Computers 105 generally each include instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 105 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 500, one or more of the steps could be omitted, or the steps could be executed in a different order than shown. In other words, the descriptions of systems and/or processes herein are provided for the purpose of illustrating certain embodiments and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A system, comprising:
   a computer in a vehicle, programmed to:
   determine that a total wheel impact count (TC) severity level threshold is exceeded by determining that a first plurality of wheel impacts detected at a first respective plurality of timesteps exceed a first impact severity threshold, and that a second plurality of wheel impacts detected at a second respective plurality of timestamps exceed a second impact severity threshold, then applying a first weight to the first wheel impacts and a second weight to the second plurality of wheel impacts, and then generating a combination of the weighted first and second wheel impacts to yield a total wheel impact count that is compared to the total wheel impact count (TC) severity level threshold; and
   transmit a message, based on the total wheel impact count severity threshold being exceeded, via a vehicle communications network; and
   an electronic controller for a component in the vehicle programmed to:
   based on receiving the message in the electronic controller, make an adjustment to monitoring the component;
   wherein the adjustment to monitoring the component by the controller includes at least one of:
   reducing a fault maturation time;
   resetting the fault maturation time;
   adjusting a monitoring parameter; or
   adjusting one or more of a rate of data monitoring and sampling; and
   wherein the adjustment to monitoring the component by the controller further includes modifying operation of the component.

2. The system of claim 1, wherein the adjustment to monitoring the component is based on at least one of identifying the wheel impacted, an impact severity level, or a predicted cause.

3. The system of claim 1, wherein the adjustment to monitoring the component is based on output from a deep neural network (DNN), the output generated from input data from a plurality of vehicles in which a vehicle health condition resulting from a wheel impact has been detected.

4. The system of claim 1 wherein the controller is further programmed to:
   monitor the component based on the adjustment to monitoring the component; and
   perform an action upon determining based on the monitoring that a vehicle health condition is indicated.

5. A system, comprising:
   a computer in a vehicle, programmed to:
   determine that a total wheel impact count (TC) severity level threshold is exceeded by determining that a first plurality of wheel impacts detected at a first respective plurality of timesteps exceed a first impact severity threshold, and that a second plurality of wheel impacts detected at a second respective plurality of timestamps exceed a second impact severity threshold, then applying a first weight to the first wheel impacts and a second weight to the second plurality of wheel impacts, and then generating a combination of the weighted first and second wheel impacts to yield a total wheel impact count that is compared to the total wheel impact count (TC) severity level threshold; and
   transmit a message, based on the total wheel impact count severity threshold being exceeded, via a vehicle communications network; and
   an electronic controller for a component in the vehicle programmed to:
   based on receiving the message in the electronic controller, make an adjustment to monitoring the component including modifying operation of the component.

6. The system of claim 5, wherein the adjustment to monitoring the component is based on at least one of identifying the wheel impacted, an impact severity level, or a predicted cause.

7. The system of claim 5, wherein the adjustment to monitoring the component is based on output from a deep neural network (DNN), the output generated from input data from a plurality of vehicles in which a vehicle health condition resulting from a wheel impact has been detected.

8. The system of claim 5, wherein the controller is further programmed to:
   monitor the component based on the adjustment to monitoring the component; and
   perform an action upon determining based on the monitoring that a vehicle health condition is indicated.

* * * * *